Dec. 13, 1955  E. R. LEARD  2,726,596
ELECTRIC TOASTER

Filed March 9, 1953  3 Sheets-Sheet 2

Eldred Raymond Leard
Inventor
By: Jewett, Mead, Browne & Schuyler
Attorneys

Dec. 13, 1955  E. R. LEARD  2,726,596
ELECTRIC TOASTER

Filed March 9, 1953  3 Sheets-Sheet 3

Eldred Raymond Leard
Inventor

By: Jewett, Mead, Browne & Schuyler
Attorneys

United States Patent Office 2,726,596
Patented Dec. 13, 1955

2,726,596

ELECTRIC TOASTER

Eldred Raymond Leard, Denistone, near Sydney, New South Wales, Australia, assignor to Australian General Electric Proprietary Limited, Sydney, New South Wales, Australia Application March 9, 1953, Serial No. 341,053

Claims priority, application Australia March 25, 1952

4 Claims. (Cl. 99—329)

This invention relates to electric toasters of the kind in which ejector and timing devices are incorporated so that when a piece of bread is toasted to some preselected degree, the heating current is automatically switched off and the piece of toast is partially ejected from the toaster for ready removal therefrom.

The object of the invention is to provide a toaster of the kind indicated which by comparison with prior toasters is of simple and inexpensive construction and is wholly reliable in operation.

According to this invention, an electric toaster embodying timing and toast ejector means comprises a vertically slidable carrier, a bread-slice supporter platform outrigged from said carrier, a latch pawl pivotally mounted on said carrier and adapted to latch said carrier in lowered position, a slidable pivoted latch operating bar, a thermo-responsive actuator member for said operating bar, a notch in said operating bar adapted to engage with said actuator member when the latter moves under the influence of heat, a lug extending laterally from said operating bar, a toaster element, a heater element for said actuator member, a pair of main contacts and a pair of control contacts, the two said elements and said main contacts being arranged in series circuit and said control contacts being connected across said actuator heater element, and means on said carrier for effecting closure of said main contacts when said carrier is latched in lowered position, the arrangement being such that when the notch in said operating bar engages with said actuator member the consequent pivotal movement of said operating bar closes said control contacts to short-circuit said heater element so that return movement of said actuator member causes the lug on said operating bar to release said latch pawl thereby to permit said carrier to rise, under spring urge, with consequent partial ejection of toasted bread slices, opening of said main and control contacts, and restoration of said operating bar to normal position.

Preferably, also, the subject invention includes means whereby the toasting period may be varied, such means comprising a cam member adapted for contact with the mentioned lug on said operating bar whereby the normal position of the latter may be adjusted.

For a more complete understanding of this invention, one practical embodiment thereof will now be described in detail, reference being made to the accompanying drawings wherein.

Figure 1:
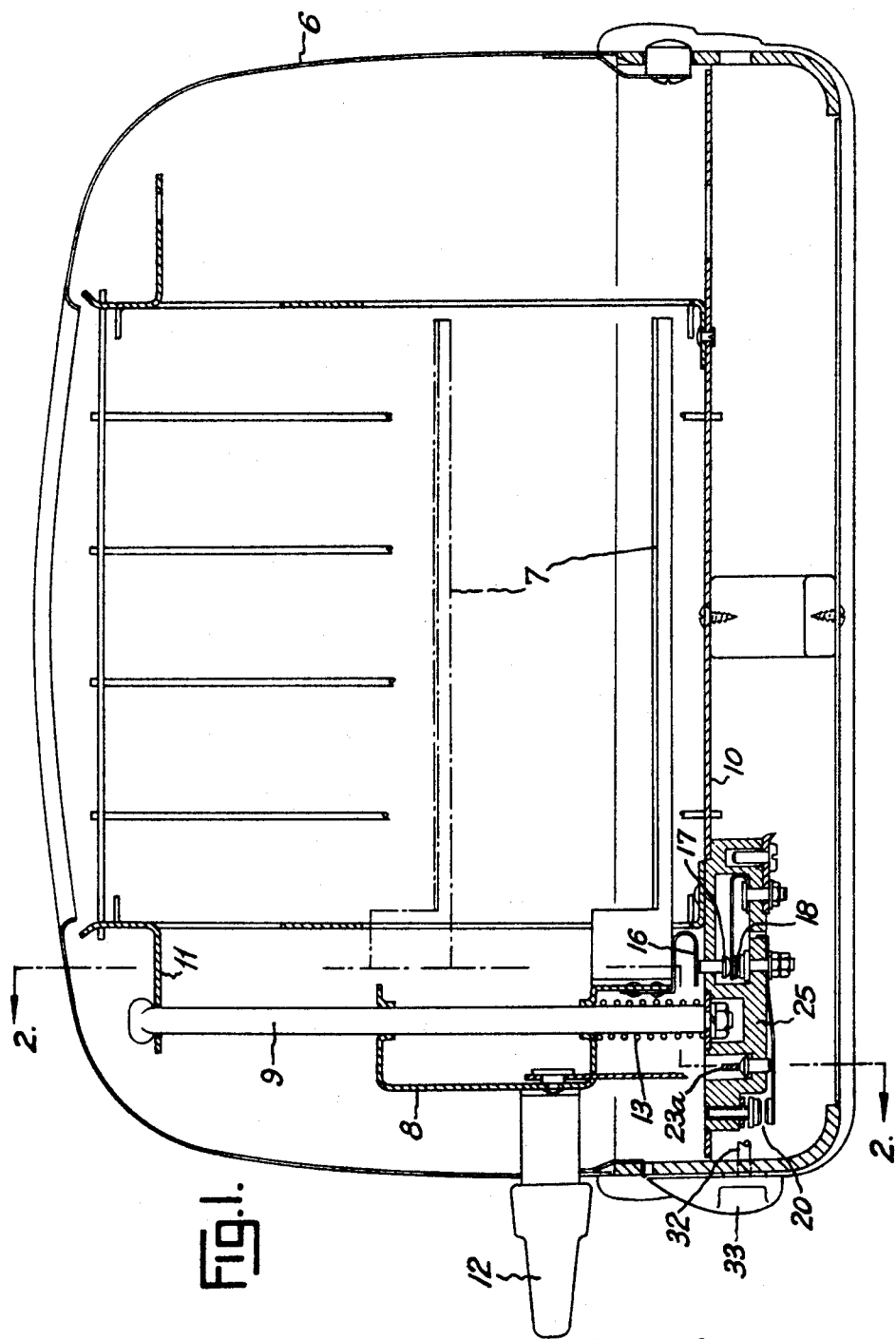
Figure 1 is a longitudinal section of a toaster in accordance with said embodiment.
Figure 2:
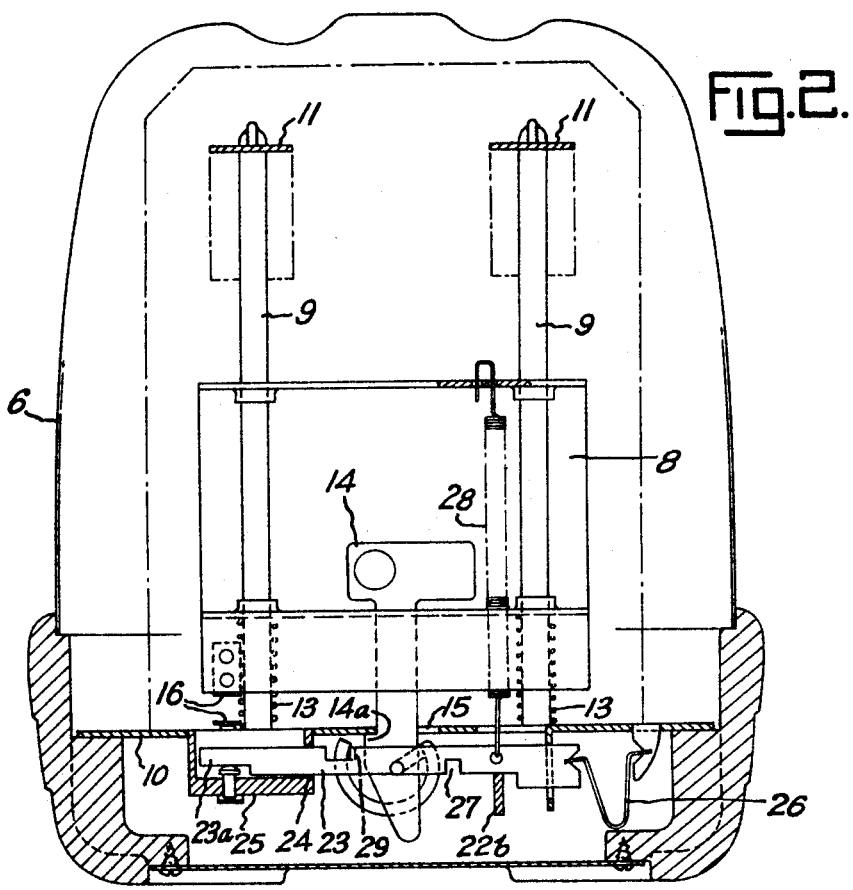
Figure 2 is a transverse section on line 2—2 of Figure 1.
Figure 3:
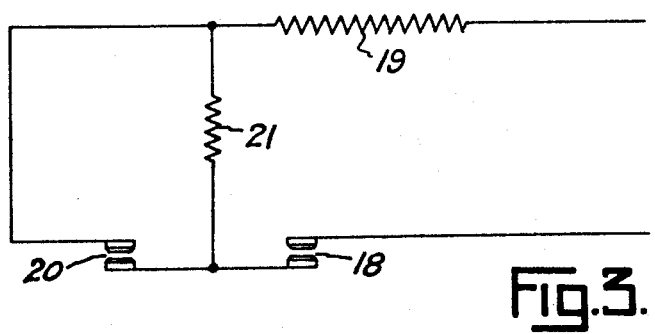
Figure 3 is an electrical circuit diagram.
Figure 4:
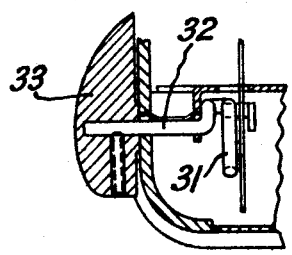
Figure 4 is a sectional detail illustrating a cam for varying the toasting period.
Figure 5:
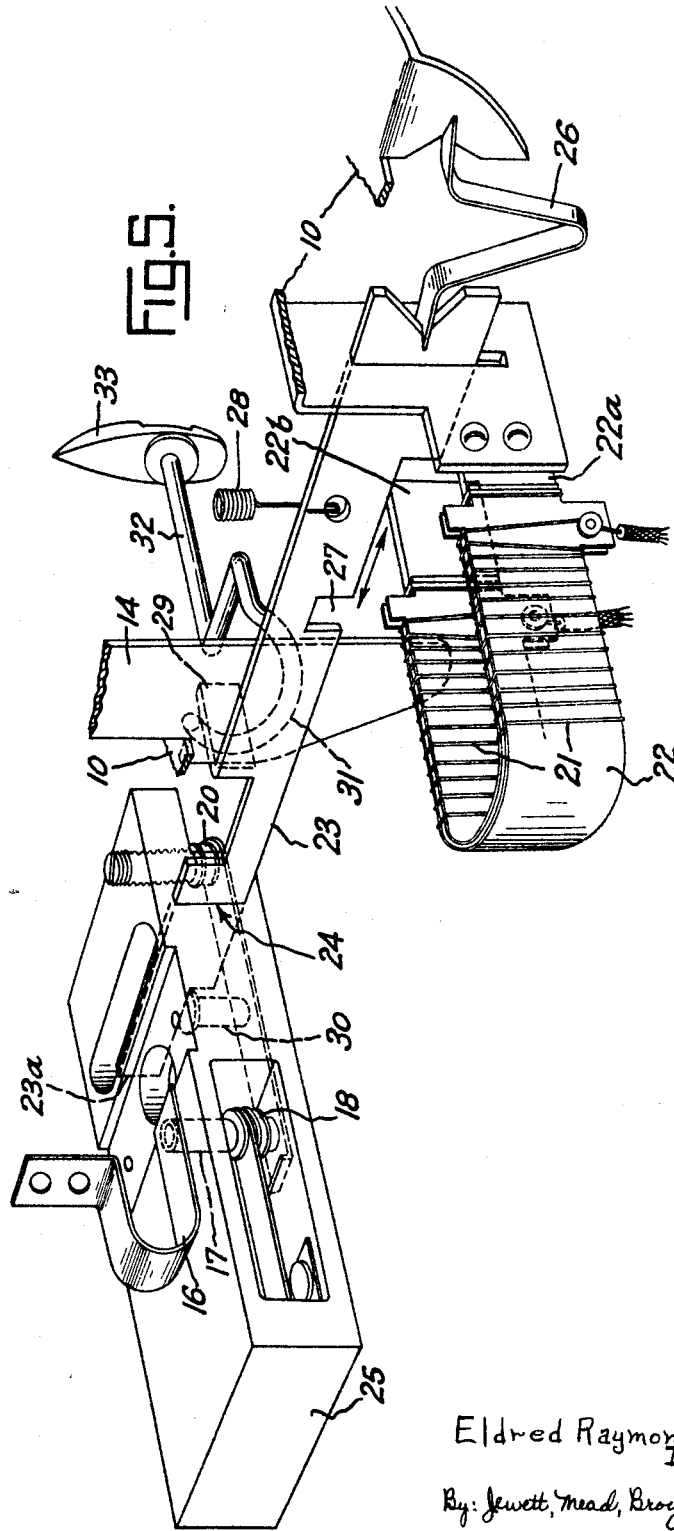
Figure 5 is an enlarged perspective view of essential mechanism.

Referring now to those drawings, the present toaster comprises a box-like casing 6 which has one or more vertical open-top bread-slice ways (not illustrated) therein and houses bread heater elements (not illustrated in the constructional views), of more or less conventional design.

The bread-slice ways are floored by a vertically movable slice supporter platform 7 extending as a cantilever from a carrier 8 which is slidable upon a pair of upright slide bars 9 fixedly mounted inside the casing and extending between the floor plate 10 and internal lugs 11. The carrier 8 has a finger knob 12 fixed thereto which extends through a slot in the casing 6 and upon manual depression of which the carrier 8 and the supporter platform 7 may be lowered against the loading effect of springs 13 wrapped around slide bars 9 and applied to the carrier in such manner that they constantly influence it to assume, or remain in, the elevated position. The carrier 8 has a latch pawl 14 thereon which is pivotally mounted by its upper end to the carrier and extends through a latch hole 15 in the casing floor plate 10. The latch pawl 14 is overweighed (as illustrated) or lightly spring loaded, so that when the carrier 8 is lowered said latch pawl will hold the carrier in its lowermost position until the latch pawl is released from engagement with floor plate 10.

On the underside of the carrier 8 there is a spring leaf 16 which when the carrier is in (or almost in) its lowermost position bears upon a thrust button 17 thereby to close a pair of main contacts 18 in the circuit of the toaster heater element 19. The circuit also includes a pair of control contacts 20 and a control heater element 21 which is associated with a thermo-responsive actuator member which is herein illustrated as a U-shaped bimetallic strip 22. The toaster element and the two sets of contacts are wired in series for connection to a usual source of current supply, and the control element is connected across the control contacts.

The bimetallic strip 22 has one end 22a fixedly mounted upon the toaster chassis with its other end 22b free for lateral movement in response to temperature changes in said strip. An operating bar 23 is associated with the actuator member 22. This operating bar 23 is pivotally mounted to the toaster chassis by extending through a slot 24 in a contact carrying block 25 and is endwisely slidable in slot 24 and endwisely loaded by a leaf spring 26 or the like so that at all times the operating bar 23 is influenced to remain at one end of its longitudinal travel range. The lower edge of the operating bar 23 normally rests upon the free end 22b of the actuator member 22, and said operating bar has a notch 27 therein which is able to register with the actuator bar end 22b for the purpose of allowing a slight turning movement of said operating bar about its pivotal support in slot 24 as described later herein. A tension spring 28 has one end anchored to the operating bar 23 and its other end to the carrier 8. The arrangement of this spring is such that when the carrier 8 is in the illustrated fully descended position the spring 28 is slack and therefore imposes no load upon the operating bar 23. When however the carrier 8 is in elevated position (not illustrated) the spring 28 is tensioned and thus applies a loading to the operating bar 23 tending to lift it clear of the actuator member end 22b. The operating bar 23 has a lug 29 extending laterally therefrom and the previously mentioned latch pawl 14 lies in the path of that lug. A tail-piece 23a on the operating bar 23 extends over a push button 30 associated with the control contacts 20 for the purpose hereinafter described.

In use, when a slice of bread is to be toasted, and assuming that the carrier 8 is in its uppermost position, the slice of bread is inserted through one of the bread-slice ways until it rests on supporter platform 7 and the carrier finger knob 12 is depressed so that the slice of bread resting upon the platform 7 descends therewith. As the carrier 8 reaches the lowermost point of its movement range the latch pawl 14 on the carrier operates to hold the carrier at the bottom of its movement range by virtue of the pawl 14a engaging beneath floor plate 10. At the same time the spring leaf 16 on the carrier 8 depresses the thrust button 17 to close the main contacts 18 so that the circuit through the control heater element 21 and the toaster heater element 19 is thereby completed. Heat generated by the control heater elements 21 causes the end 22b of bimetallic strip 22 to deflect towards the notch 27 in the operating bar 23. When the free end 22b of the bimetallic element 22 registers with notch 27 in the operating bar 23, the latter is then free to pivot downwardly in its pivot slot 24 with consequent upward movement of tail-piece 23a whereby pressure on push button 30 is relieved to permit closure of control contacts 20 thereby short circuiting the control heater element 21 while leaving the toaster heater element 19 still effectively in circuit. In consequence of this the bimetallic strip 22 cools and therefore return deflection of the end 22b thereof will occur. During this return deflection the free end 22b of the strip 22 engaged in the operating bar notch 27 moves the operating bar 23 endwisely against the loading of its spring 26 and, in this action, the lug 29 on the operating bar 23 bears against the latch pawl 14 thereby disengaging it and thus freeing the carrier 8 for upward movement under the influence of its lifter springs 13. Upward movement of the carrier tensions the loading spring 28 (which is slack when the carrier is descended) thus lifting the operating bar 23 so that its notch 27 is removed from engagement with end 22b the bimetallic strip 22 and the endwise loading spring 26 reverts the operating bar 23 to its original position, thus again opening the control contacts 20. The upward movement of carrier 8 also causes the main contacts 18 to open thereby isolating the toaster heater element and completing the toasting cycle.

It is preferred that means be incorporated to enable the toasting period to be selectable in accordance with the degree of toast "brownness" required and to enable a toasting operation to be halted, if required, before the full toasting cycle, as above described, is finished. Such means comprise an arcuate cam rod 31 eccentrically disposed on a short shaft 32 which extends through the toaster casing and externally thereof has a finger knob 33 secured thereon. The arcuate cam rod 31 passes about the lug 29 on the operating bar 23 so that turning of the eccentric cam 31 will effect endwise movement of the operating bar 23 or, by being set in some selected position, will impose a longitudinal travel range thereon which corresponds to a shortened or lengthened toasting period. The finger knob 33 for the eccentric cam 31 may have a pointer thereon which is referable to an arcuate scale inscribed on the outside of the toaster casing and which may be calibrated in minutes of toasting time or otherwise. It will be clear that with such an arrangement sufficient rotation of the cam 31, during the course of a toasting operation, will cause an endwise movement of the operating bar 23 sufficient to release the latch pawl 14 and thereby open the toaster element circuit by elevation of the carrier and the toast supporter platform associated therewith.

I claim:

1. In an automatic electric toaster of the type embodying timing means, toast ejecting means, a vertically slidable carrier having a bread-slice supporting platform outrigged therefrom, and a latch pawl pivoted to said carrier for latching the latter, when lowered, to a fixed frame element of said toaster; a U-shaped bimetal bar having one end fixedly anchored and its other end free for deflection in response to change in temperature, a slidably pivoted latch pawl releasing bar, a notch in said latch pawl releasing bar for engagement with said other end of said bimetal bar when the latter is deflected by temperature rise into registration with said notch, a lug laterally extending from said latch pawl releasing bar for direct engagement with said latch pawl when said latch pawl releasing bar is moved by return deflection of said bimetal bar, a compression spring for normally biasing said latch pawl releasing bar in the direction of latching of said latch pawl, a resilient coupling between said latch pawl releasing bar and said carrier, a toaster element, a heater element for said bimetal bar, a pair of main contacts and a pair of control contacts, the two said elements and said main contacts being arranged in series circuit and said control contacts being connected across said heater element, resilient abutment means on said carrier for effecting closure of said main contacts when said carrier is latched in lowered position, and an extension tail on said latch pawl releasing bar for maintaining said control contacts open when said notch in said latch pawl releasing bar is not engaged with said bimetal bar; the arrangement being such that when the notch in said latch pawl releasing bar engages with said bimetal bar, the consequent pivotal movement of said latch pawl releasing bar permits closure of said control contacts to effect short circuiting of said heater element so that, on cooling of the bimetal bar said other end of the latter imparts longitudinal movement to said latch pawl releasing bar whereby the lug extending from the latter directly engages said latch pawl to effect unlatching thereof, thereby permitting said carrier to rise under spring urge with consequent partial ejection of toasted bread slices, opening of said main contacts, freeing of the notch in said latch pawl releasing bar from engagement with said other end of said bimetal bar, restoration of said latch pawl releasing bar under the urge of said compression spring, and reopening of said control contacts.

2. The invention according to claim 1 characterised by the provision of an eccentric cam, adapted for adjustable contact with the lug extending from said latch pawl releasing bar, whereby the extent of travel of the latter may be varied.

3. In an automatic electric toaster of the type embodying timing means, toast ejecting means, a vertically slidable carrier having a bread-slice supporting platform outrigged therefrom, and a latch pawl pivoted to said carrier for latching the latter, when lowered, to a fixed frame element of said toaster; a U-shaped bimetal bar having one end fixedly anchored and its other end free for deflection in response to change in temperature, a latch pawl releasing bar, a notch in said latch pawl releasing bar for engagement with said other end of said bimetal bar when the latter is deflected by temperature rise into registration with said notch, a lug laterally extending from said latch pawl releasing bar for direct engagement with said latch pawl when said latch pawl releasing bar is moved by return deflection of said bimetal bar, a compression spring for normally biasing said latch pawl releasing bar in the direction of latching of said latch pawl, a resilient coupling between said latch pawl releasing bar and said carrier, at least one toaster element, a heater element wrapped about said bimetal bar, a contact carrying block, a fixed main contact and a movable main contact mounted in said block, a fixed control contact and a movable control contact also mounted in said block, the two said elements and said main contacts being arranged in series circuit and said control contacts being connected across said heater element, resilient abutment means on said carrier for moving said movable main contact into contact with said fixed main contact when said carrier is latched in lowered position, a slot in said block for slidably pivoting said latch pawl releasing bar, and an extension tail on said latch pawl releasing bar overlying said movable control contact for maintaining said control contacts open when said notch in said latch pawl releasing bar is not engaged with said bimetal bar; the arrangement being such that when the notch in said latch pawl releasing bar engages with said bimetal bar, the consequent pivotal movement of said latch pawl releasing bar permits automatic closure of said control contacts to effect short circuiting of said heater element so that, on cooling of the bimetal bar, return deflection of said other end of the latter imparts longitudinal movement to said latch pawl releasing bar whereby the lug extending from the latter directly engages said latch pawl to effect unlatching thereof, thereby permitting said carrier to rise under spring urge with consequent partial ejection of toasted bread slices, opening of said main contacts, freeing of the notch in said latch pawl releasing bar from engagement with said other end of said bimetal bar, restoration of said latch pawl releasing bar under the urge of said compression spring, and re-application pressure to said movable control contact whereby said control contacts are re-opened.

4. The invention according to claim 3 characterised by the provision of an eccentric cam, adapted for adjustable contact with the lug extending from said latch pawl releasing bar, whereby the extent of travel of the latter may be varied.

References Cited in the file of this patent

UNITED STATES PATENTS

| | | |
|---|---|---|
| 2,234,764 | Ireland | Mar. 11, 1941 |
| 2,237,100 | Gomersall | Apr. 1, 1941 |
| 2,266,024 | Gomersall | Dec. 16, 1941 |
| 2,271,520 | Strauss | Feb. 3, 1942 |
| 2,337,124 | Olving | Dec. 21, 1943 |
| 2,396,541 | Taylor | Mar. 12, 1946 |